US010558113B1

(12) United States Patent
Kuo et al.

(10) Patent No.: US 10,558,113 B1
(45) Date of Patent: Feb. 11, 2020

(54) OBJECT DRIVING DEVICE AND OBJECT DRIVING METHOD

(71) Applicant: QISDA CORPORATION, Taoyuan (TW)

(72) Inventors: Jun-Hao Kuo, New Taipei (TW); Cheng-Kuo Chen, Taipei (TW); Hsin-Tsung Feng, Taoyuan (TW); Wei-Chih Chen, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/290,963

(22) Filed: Mar. 4, 2019

(30) Foreign Application Priority Data

Nov. 8, 2018 (CN) .......................... 2018 1 1326187

(51) Int. Cl.

| H04N 7/18 | (2006.01) |
|---|---|
| G03B 17/56 | (2006.01) |
| G06T 7/73 | (2017.01) |
| G06T 5/00 | (2006.01) |
| G06T 5/50 | (2006.01) |
| G02B 27/00 | (2006.01) |
| B08B 1/00 | (2006.01) |
| H04N 5/225 | (2006.01) |

(52) U.S. Cl.
CPC ............ *G03B 17/568* (2013.01); *B08B 1/006* (2013.01); *B08B 1/008* (2013.01); *G02B 27/0006* (2013.01); *G06T 5/002* (2013.01); *G06T 5/50* (2013.01); *G06T 7/73* (2017.01); *H04N 5/2251* (2013.01); *G06T 2207/20224* (2013.01)

(58) Field of Classification Search
CPC ...................................................... G03B 17/568
USPC ........................................................... 348/143
See application file for complete search history.

(56) References Cited

U.S. PATENT DOCUMENTS

| 9,804,387 B2 * | 10/2017 | Wada et al. ........ | G02B 27/0006 348/143 |
|---|---|---|---|
| 2004/0240706 A1 * | 12/2004 | Wallace et al. | |
| 2009/0284596 A1 * | 11/2009 | Lin et al. | |
| 2011/0069190 A1 * | 3/2011 | Chou et al. | |
| 2014/0267715 A1 * | 9/2014 | Kemega et al. ... | G02B 27/0006 348/143 |

* cited by examiner

*Primary Examiner* — Leron Beck (57) ABSTRACT

An object driving device includes an object, a driving unit, an image capturing unit and a processing unit. The driving unit is connected to the object. The processing unit is electrically connected to the driving unit and the image capturing unit. The processing unit controls the driving unit to drive the object to move and controls the image capturing unit to capture a plurality of initial images. The processing unit subtracts pixel data of every two adjacent initial images from each other to obtain at least one subtracted image. The processing unit determines a current image position of the object in each of the at least one subtracted image. The processing unit determines a current real position of the object according to the current image position. The processing unit controls the driving unit to drive the object to move from the current real position to a target position.

16 Claims, 11 Drawing Sheets

OBJECT DRIVING DEVICE AND OBJECT DRIVING METHOD

BACKGROUND OF THE INVENTION

1. Field of the Invention

The invention relates to an object driving device and an object driving method and, more particularly, to an object driving device and an object driving method capable of driving an object to move from a current real position to a target position accurately.

2. Description of the Prior Art

So far in many outdoor places, there are always one or more cameras installed for safety surveillance. An outdoor camera is usually equipped with a wiper in front of a lens, so as to clean raindrops or dust in front of the lens. In general, a wiper control module has to know a current real position of the wiper first and then it may control the wiper to move accurately to clean a specific region of the lens. The conventional wiper control module controls the wiper to go back to an origin point first by an origin sensor or a brake mechanism and then controls the wiper to move from the origin point to a target position. However, the origin sensor will increase the cost and the brake mechanism will loosen the wiper after being used for a long time.

SUMMARY OF THE INVENTION

An objective of the invention is to provide an object driving device and an object driving method capable of driving an object to move from a current real position to a target position accurately, so as to solve the aforesaid problems.

According to an embodiment of the invention, an object driving device comprises an object, a driving unit, an image capturing unit and a processing unit. The driving unit is connected to the object. The processing unit is electrically connected to the driving unit and the image capturing unit. The processing unit controls the driving unit to drive the object to move and controls the image capturing unit to capture a plurality of initial images. The processing unit subtracts pixel data of every two adjacent initial images from each other to obtain at least one subtracted image. The processing unit determines a current image position of the object in each of the at least one subtracted image. The processing unit determines a current real position of the object according to the current image position. The processing unit controls the driving unit to drive the object to move from the current real position to a target position.

According to another embodiment of the invention, an object driving method comprises steps of controlling a driving unit to drive an object to move; controlling an image capturing unit to capture a plurality of initial images; subtracting pixel data of every two adjacent initial images from each other to obtain at least one subtracted image; determining a current image position of the object in each of the at least one subtracted image; determining a current real position of the object according to the current image position; and controlling the driving unit to drive the object to move from the current real position to a target position.

As mentioned in the above, the invention determines the current real position of the object by image process and calculation, so as to control the driving unit to drive the object to move from the current real position to the target position. Accordingly, the invention does not need to install the origin sensor or the brake mechanism of the prior art. Therefore, the invention can reduce the cost and improve the accuracy of driving the object to move effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
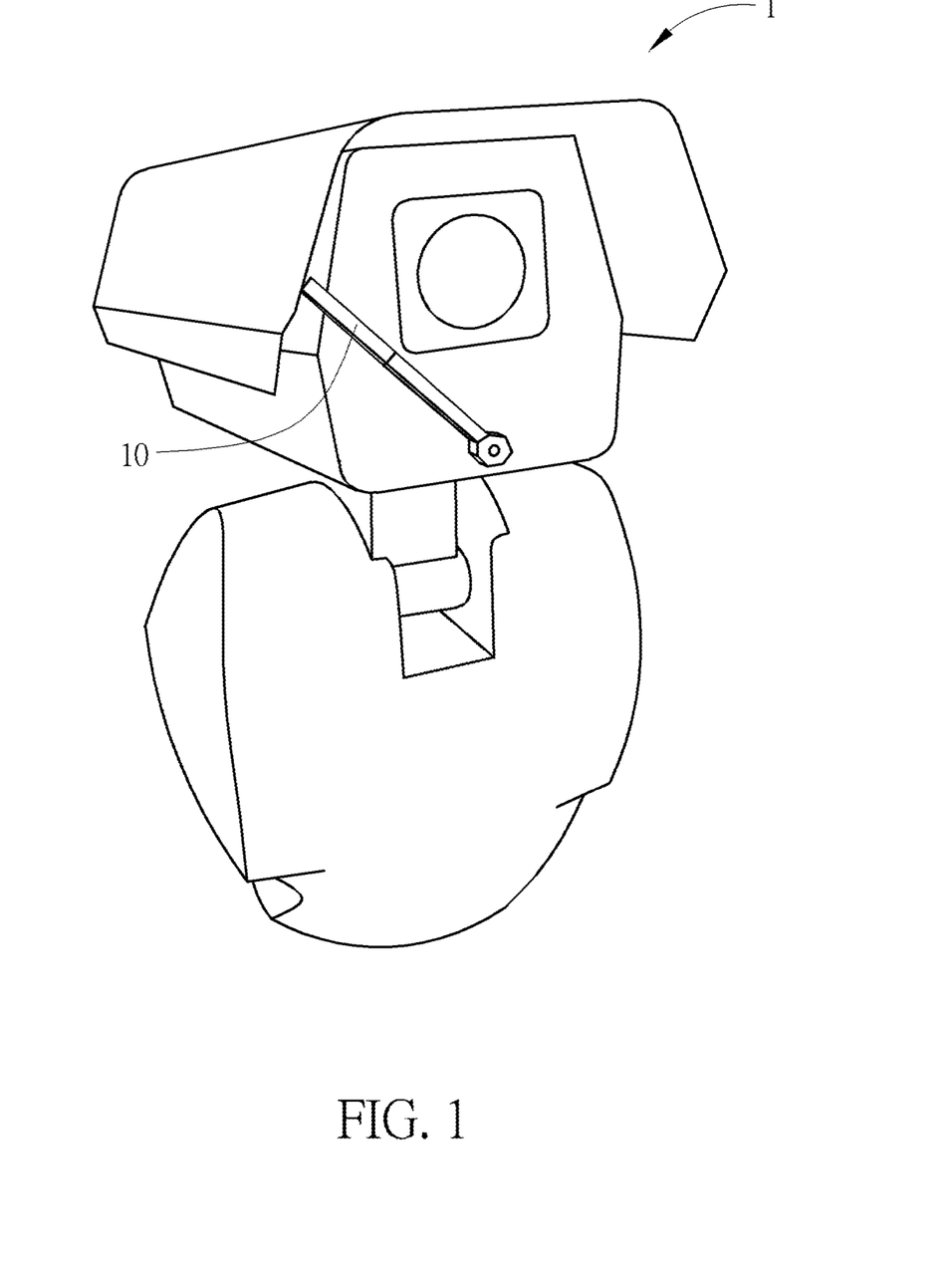
FIG. 1 is a schematic view illustrating an object driving device according to an embodiment of the invention.
Figure 2:
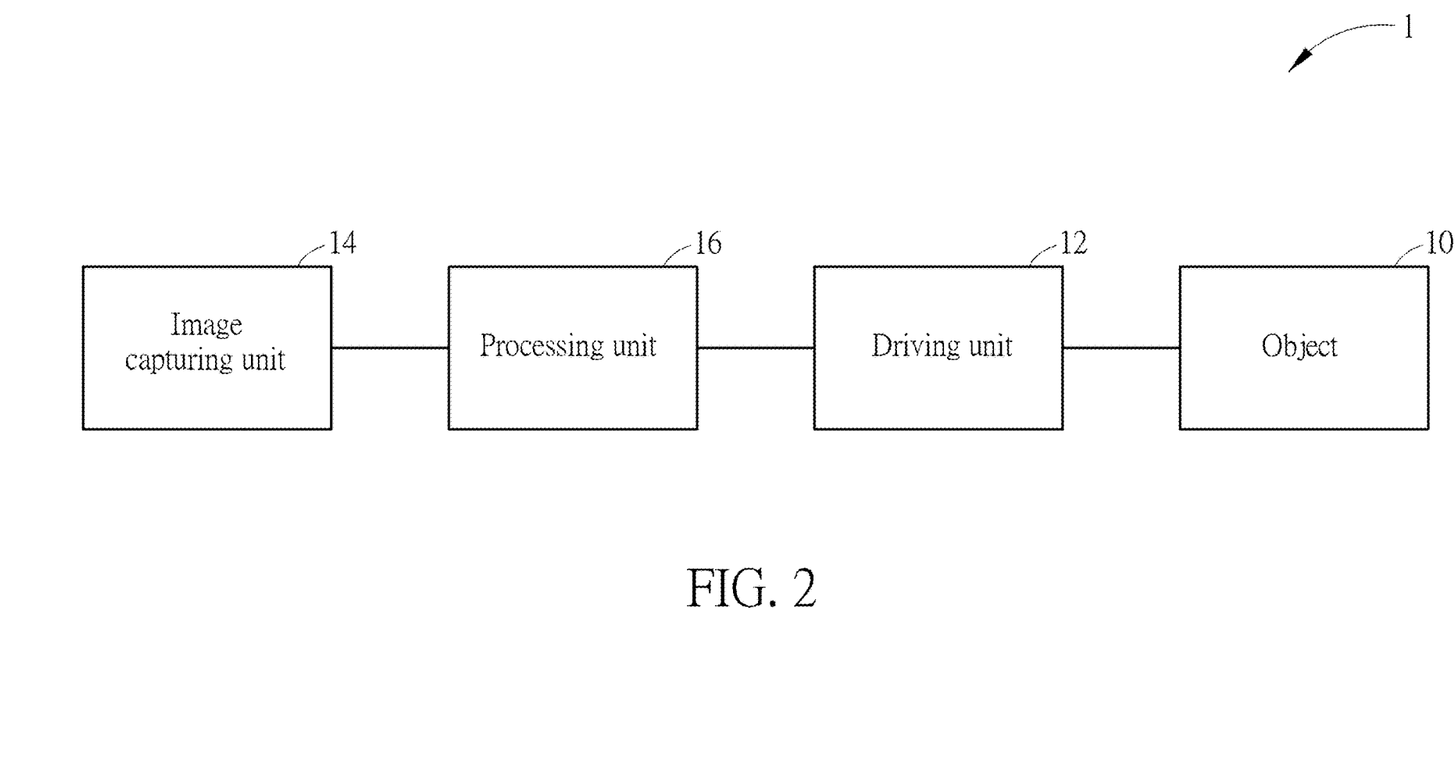
FIG. 2 is a functional block diagram illustrating the object driving device shown in FIG. 1.
Figure 3:
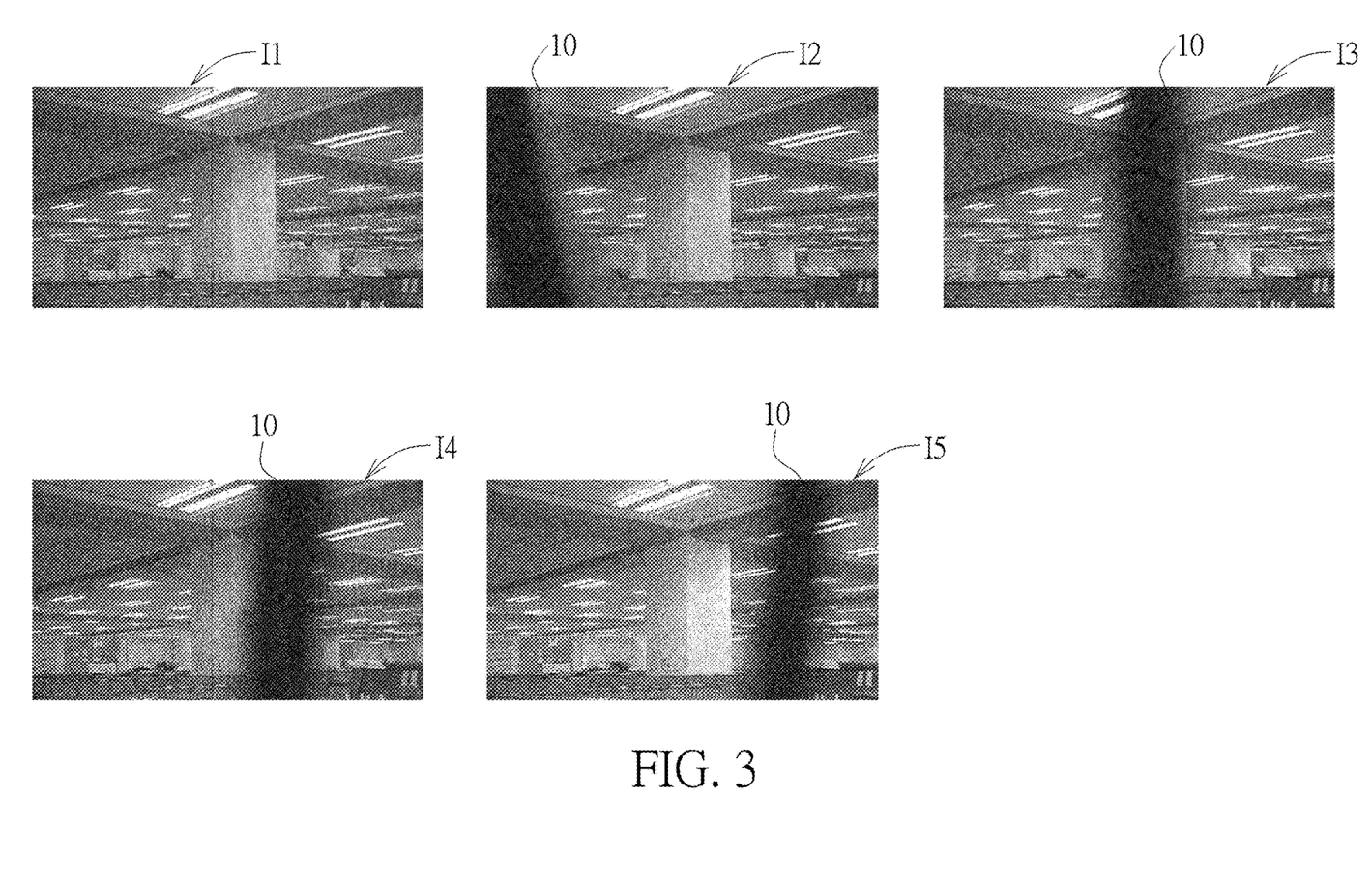
FIG. 3 is a schematic view illustrating a plurality of initial images.
Figure 4:
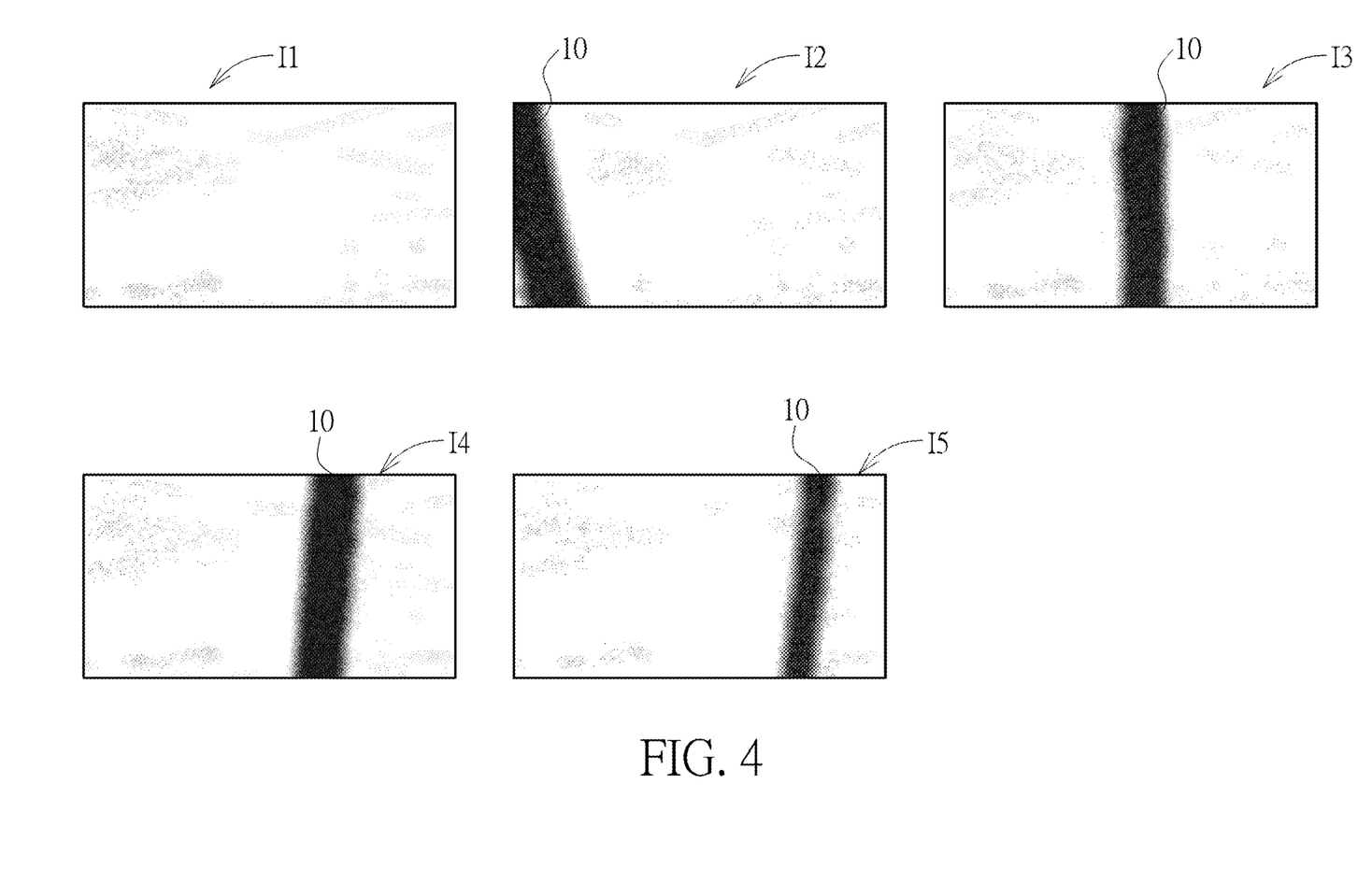
FIG. 4 is a schematic view illustrating the initial images shown in FIG. 3 after a binarization process and a blur process.
Figure 5:
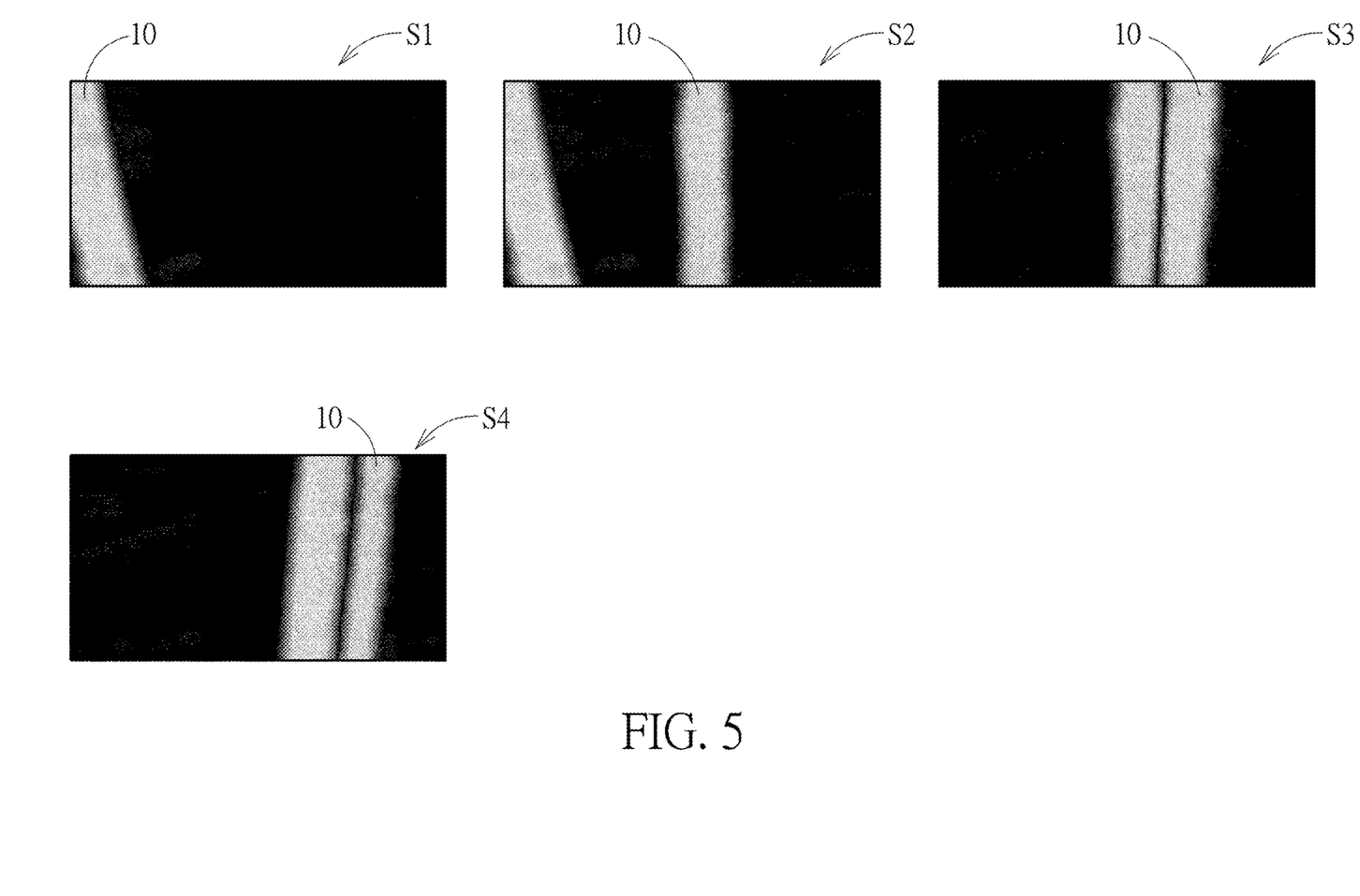
FIG. 5 is a schematic view illustrating a plurality of subtracted images.
Figure 6:
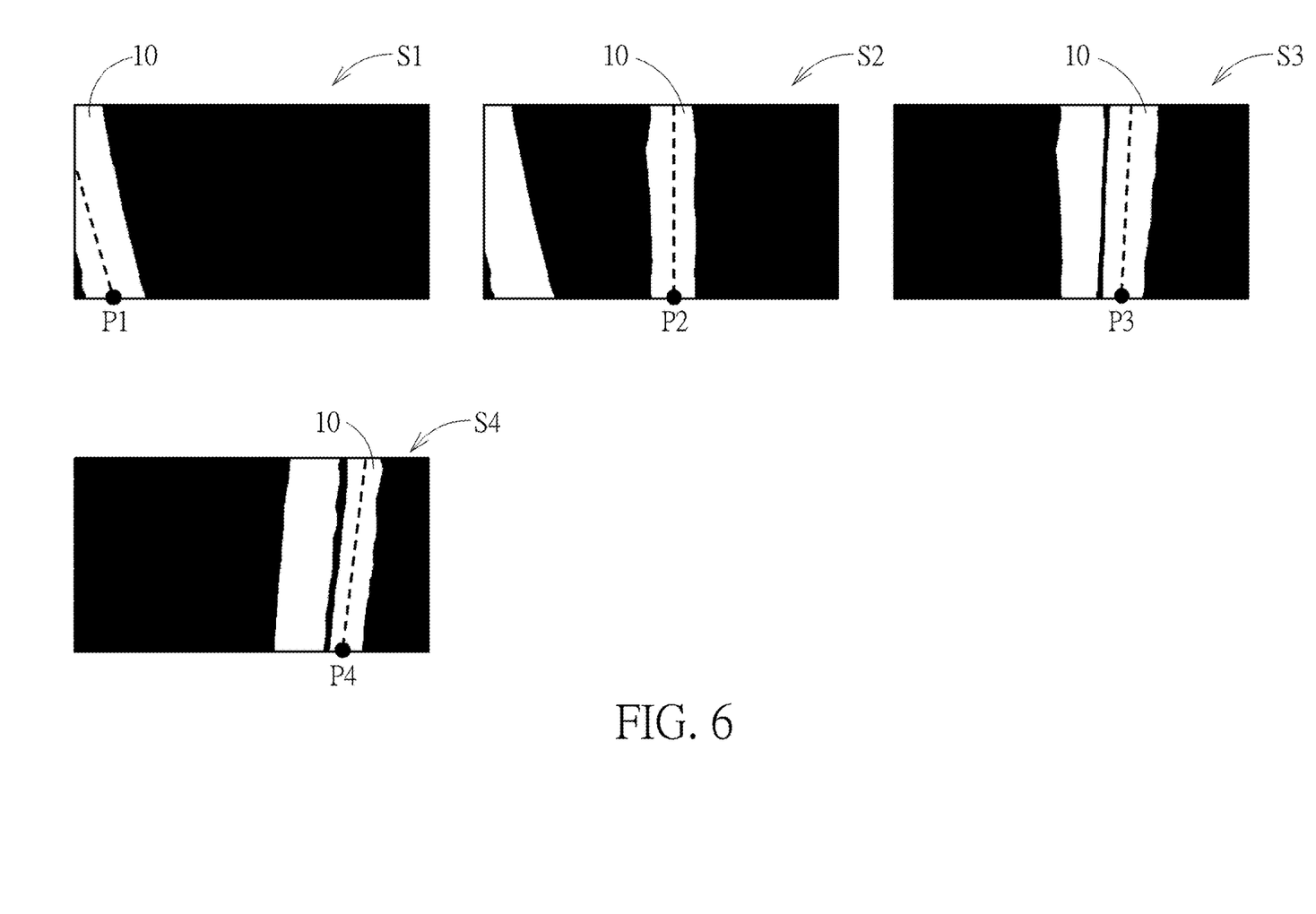
FIG. 6 is a schematic view illustrating the subtracted images shown in FIG. 5 after a binarization process.

Referring to FIGS. 1 to 6, FIG. 1 is a schematic view illustrating an object driving device 1 according to an embodiment of the invention, FIG. 2 is a functional block diagram illustrating the object driving device 1 shown in FIG. 1, FIG. 3 is a schematic view illustrating a plurality of initial images I1-I5, FIG. 4 is a schematic view illustrating the initial images I1-I5 shown in FIG. 3 after a binarization process and a blur process, FIG. 5 is a schematic view illustrating a plurality of subtracted images S1-S4, and FIG. 6 is a schematic view illustrating the subtracted images S1-S4 shown in FIG. 5 after a binarization process.

As shown in FIGS. 1 and 2, the object driving device 1 comprises an object 10, a driving unit 12, an image capturing unit 14 and a processing unit 16, wherein the driving unit 12 is connected to the object 10 and the processing unit 16 is electrically connected to the driving unit 12 and the image capturing unit 14. In this embodiment, the object driving device 1 may be, but not limited to, a camera and the object 10 may be, but not limited to, a wiper. In another embodiment, the object driving device 1 may be any devices equipped with the wiper or other movable objects. That is to say, the object 10 may be other movable objects. Furthermore, the driving unit 12 may be a motor, the image capturing unit 14 may be a charge-coupled device (CCD) sensor or a complementary metal-oxide semiconductor (CMOS) sensor, and the processing unit 16 may be a processor or a controller with data processing/calculating function. In general, the object driving device 1 may be further equipped with some necessary hardware or software components for specific purposes, such as a memory, an input/output port, applications, a circuit board, a power supply, etc., and it depends on practical applications.

In this embodiment, the driving unit 12 may drive the object 10 to move in a rotating manner. In another embodiment, the driving unit 12 may drive the object 10 to move linearly and it depends on practical applications. When the object driving device 1 is operating, the processing unit 16 controls the driving unit 12 to drive the object 10 to move and controls the image capturing unit 14 to capture a plurality of initial images I1-I5, as shown in FIG. 3. Since the image capturing unit 14 captures the initial images I1-I5 during the movement of the object 10, the object 10 appears at different positions of the initial images I1-I5. It should be noted that the number of the initial images captured by the image capturing unit 14 may be determined according to practical applications, so the invention is not limited to the embodiment shown in the figures.

Then, the processing unit 16 performs a binarization process and a blur process on each of the initial images I1-I5, so as to obtain the initial images I1-I5 shown in FIG. 4. Then, the processing unit 16 subtracts pixel data of every two adjacent initial images I1-I5 from each other to obtain at least one subtracted image S1-S4, as shown in FIG. 5. For further illustration, the subtracted image S1 is obtained by subtracting pixel data of two adjacent initial images I1, I2, the subtracted image S2 is obtained by subtracting pixel data of two adjacent initial images I2, I3, the subtracted image S3 is obtained by subtracting pixel data of two adjacent initial images I3, I4, and the subtracted image S4 is obtained by subtracting pixel data of two adjacent initial images I4, I5.

Before subtracting pixel data of every two adjacent initial images I1-I5 from each other, the purpose of performing the binarization process on each of the initial images I1-I5 is to separate the foreground and the background from each other in the image. After performing the binarization process on each of the initial images I1-I5, the purpose of performing the blur process on each of the initial images I1-I5 is to further lighten the background in the image. It should be noted that if the background is not complicated, the invention may not perform the blur process on each of the initial images I1-I5. That is to say, after performing the binarization process on each of the initial images I1-I5, the invention may subtract pixel data of every two adjacent initial images I1-I5 from each other immediately to obtain the subtracted images S1-S4. In other words, the processing unit 16 may selectively perform or not perform the blur process on each of the initial images I1-I5 according to the complexity of the background. It should be noted that the binarization process and the blur process are well known by one skilled in the art, so those will not be depicted herein in detail.

After obtaining the subtracted images S1-S4, the processing unit 16 may perform the binarization process on each of the subtracted images S1-S4 again, so as to obtain the subtracted images S1-S4 shown in FIG. 6. Then, the processing unit 16 determines a current image position of the object 10 in each of the subtracted images S1-S4. As shown in FIG. 6, the current image positions of the object 10 in the subtracted images S1-S4 may be represented by P1-P4. In this embodiment, the invention may take a center of the object 10 to be the current image position of the object 10, but is not so limited.

Then, the processing unit 16 determines a current real position of the object 10 according to the current image position. In this embodiment, the processing unit 16 may determine the current real position of the object 10 according to a ratio of the current image position to an image width of the subtracted image and a rotation angle range of the driving unit 12. In other words, the processing unit 16 may determine the current real position of the object 10 by an equation 1 below:

$$Pr = \frac{Pi}{W} \times RA. \qquad \text{Equation 1}$$

In the equation 1, Pr represents the current real position of the object 10, Pi represents the current image position of the object 10, w represents the image width of the subtracted image, and RA represents the rotation angle range of the driving unit 12.

Figure 7:
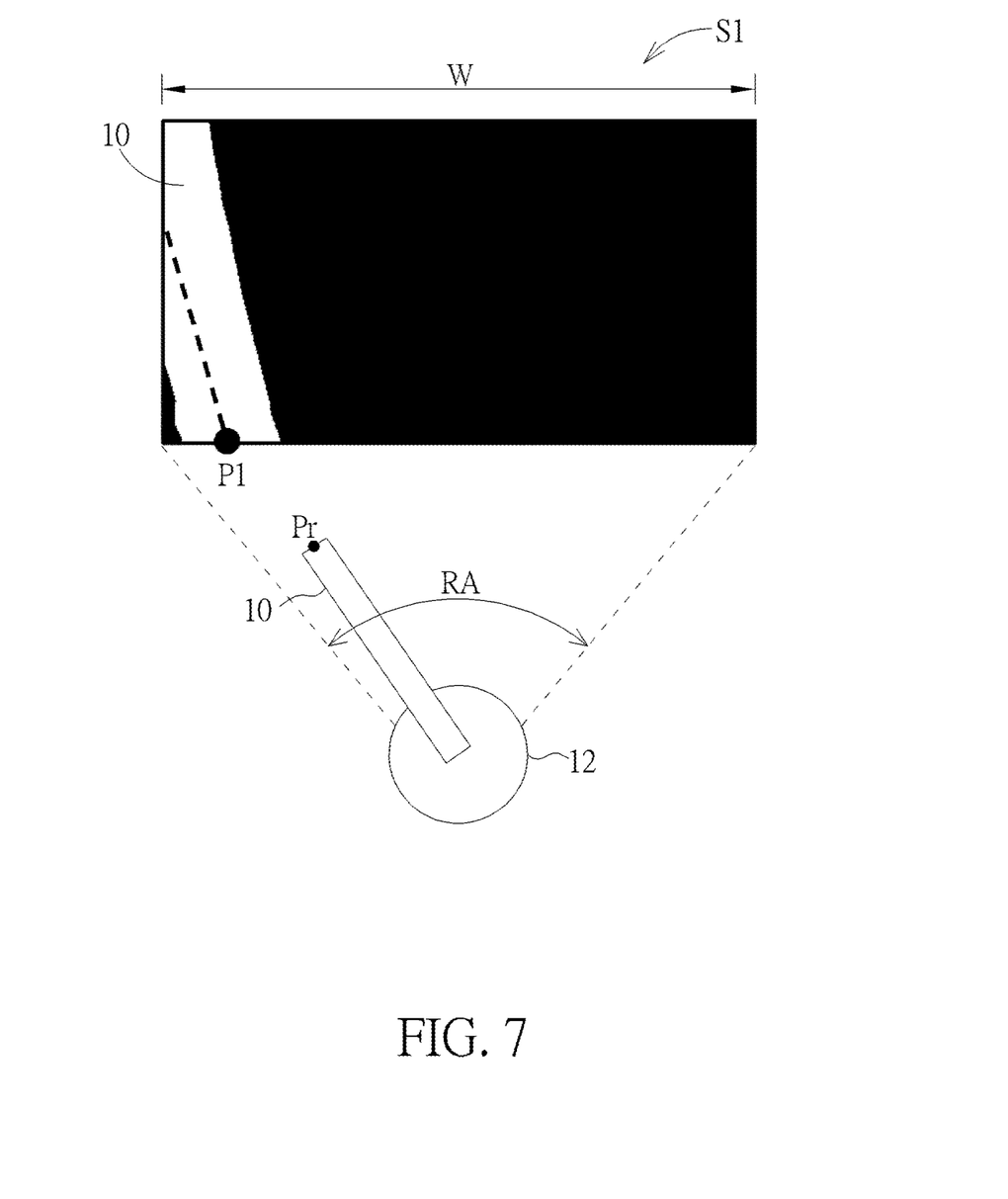
FIG. 7 is a schematic view illustrating the current real position of the object determined according to the subtracted image.

Referring to FIG. 7, FIG. 7 is a schematic view illustrating the current real position Pr of the object 10 determined according to the subtracted image S1. As shown in FIG. 7, the subtracted image S1 is used for an example. If the rotation angle range RA of the driving unit 12 is 180°, the current real position Pr of the object 10 is (P1/W)*180°.

Then, the processing unit 16 can control the driving unit 12 to drive the object 10 to move from the current real position to a target position. In this embodiment, when the current real position is located at a first side of the target position, the processing unit 16 may control the driving unit 12 to drive the object 10 to move to the target position in a first direction by a difference between the current real position and the target position; when the current real position is located at a second side of the target position, the processing unit 16 may control the driving unit 12 to drive the object 10 to move to the target position in a second direction by the difference between the current real position and the target position; wherein the first side is opposite to the second side and the first direction is opposite to the second direction.

Figure 8:
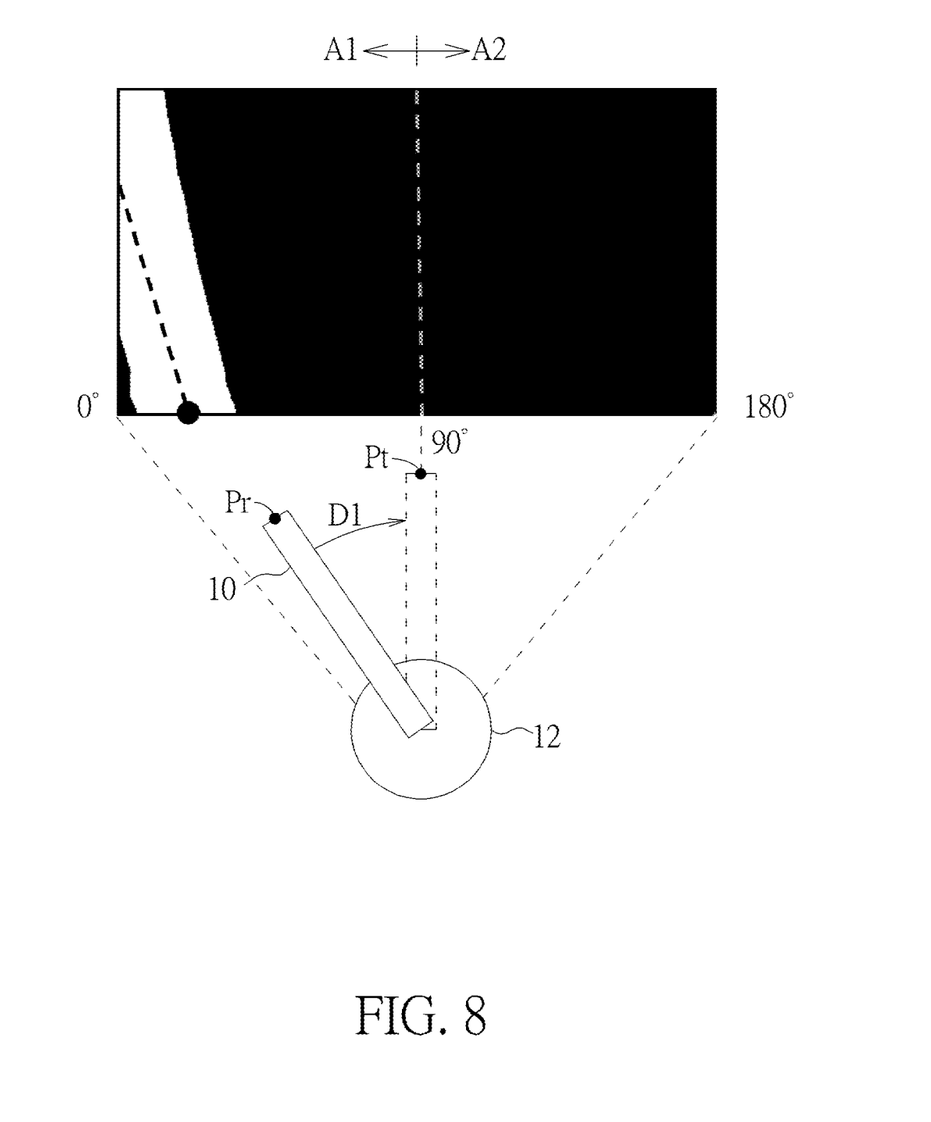
FIG. 8 is a schematic view illustrating the object being driven to move from the current real position to the target position.
Figure 9:
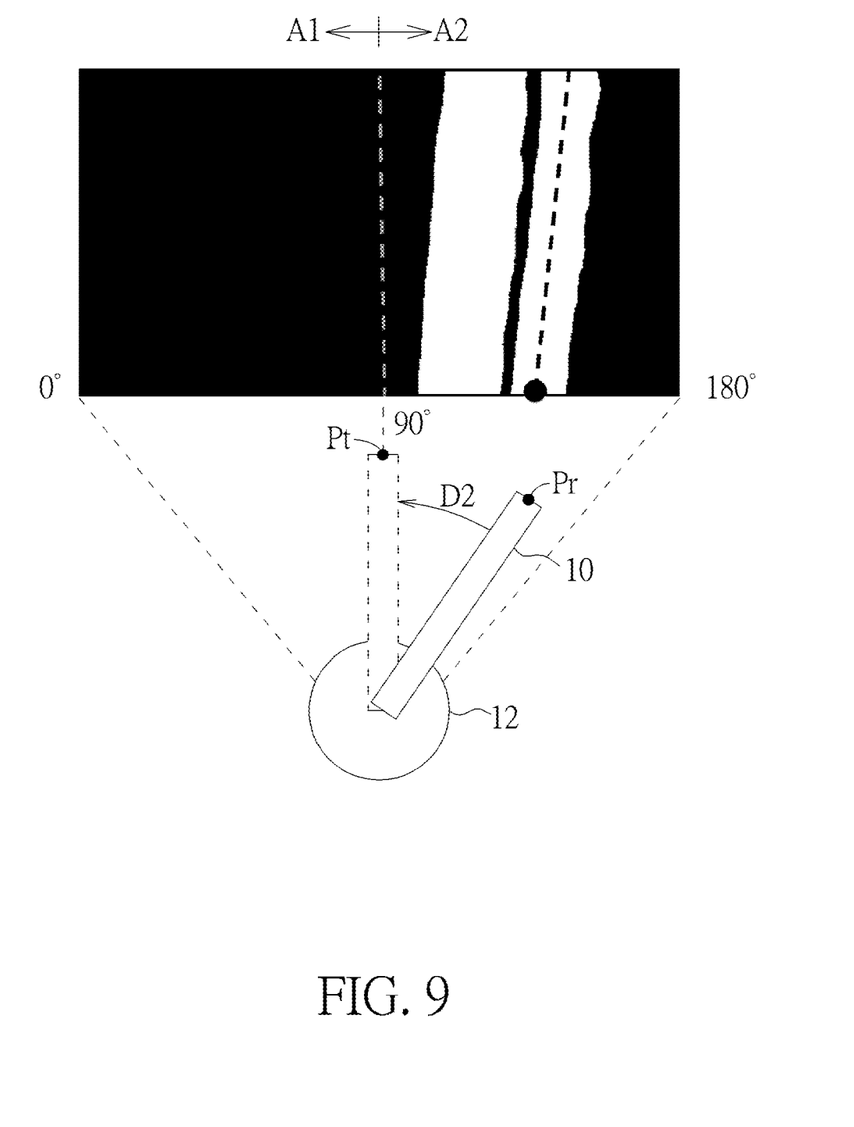
FIG. 9 is another schematic view illustrating the object being driven to move from the current real position to the target position.

Referring to FIGS. 8 and 9, FIG. 8 is a schematic view illustrating the object 10 being driven to move from the current real position to the target position, and FIG. 9 is another schematic view illustrating the object 10 being driven to move from the current real position to the target position. As shown in FIG. 8, the current real position Pr of the object 10 is located at the first side A1 of the target position Pt (e.g. 90°). Accordingly, the processing unit 16 may control the driving unit 12 to drive the object 10 to move to the target position Pt in the first direction D1 by the difference Pt−Pr (e.g. 90°−Pr) between the current real position Pr and the target position Pt. As shown in FIG. 9, the current real position Pr of the object 10 is located at the second side A2 of the target position Pt (e.g. 90°). Accordingly, the processing unit 16 may control the driving unit 12 to drive the object 10 to move to the target position Pt in the second direction D2 by the difference Pr−Pt (e.g. Pr−90°) between the current real position Pr and the target position Pt. Therefore, the object driving device 1 of the invention can drive the object 10 to move from the current real position Pr to the target position Pt accurately.

Figure 10:
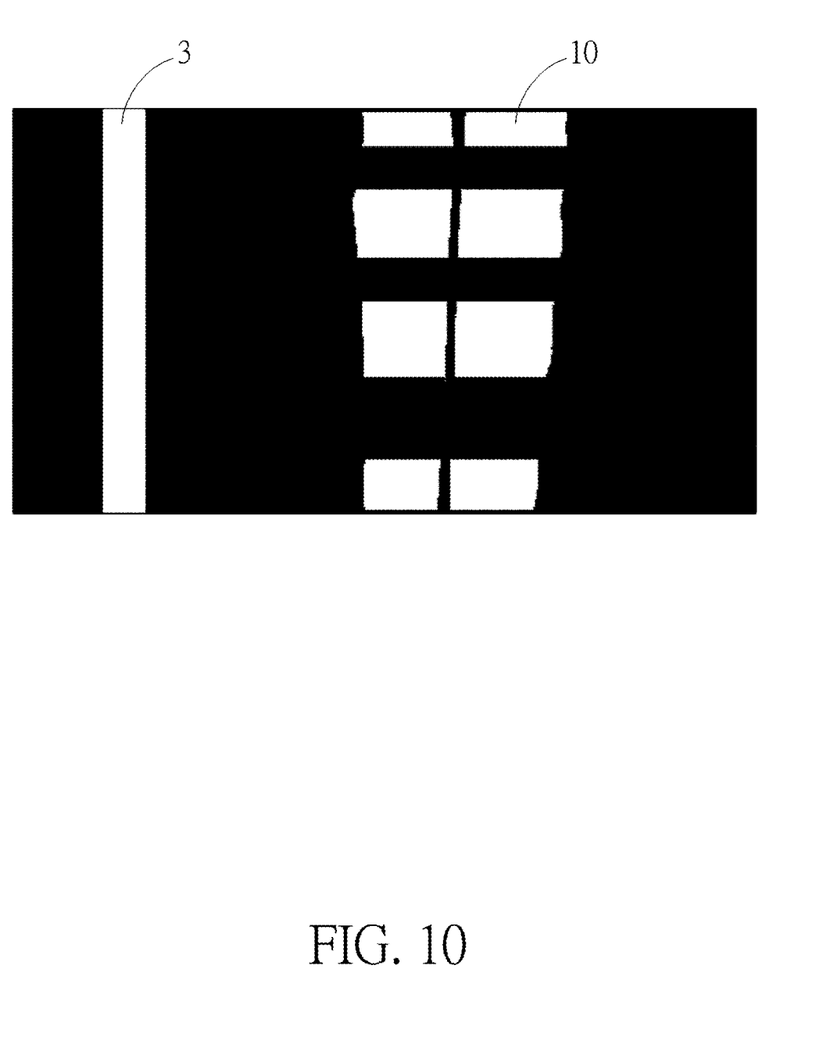
FIG. 10 is a schematic view illustrating a surface of the object having a predetermined pattern.

Referring to FIG. 10, FIG. 10 is a schematic view illustrating a surface of the object 10 having a predetermined pattern. In another embodiment, a surface of the object 10 may have a predetermined pattern (e.g. black bar and white space in a predetermined ratio). Accordingly, the object 10 in the image will have the predetermined pattern, as shown in FIG. 10. At this time, the processing unit 16 may determine the current image position of the object 10 in each of the subtracted images according to the predetermined pattern. Furthermore, the processing unit 16 may determine whether an external body exists in the image according to the predetermined pattern. As shown in FIG. 10, an external body 3 exists in the image and does not have the predetermined pattern. Accordingly, the processing unit 16 determines that the external body 3 is not the object 10 and may further remove the external body 3 from the image.

Figure 11:
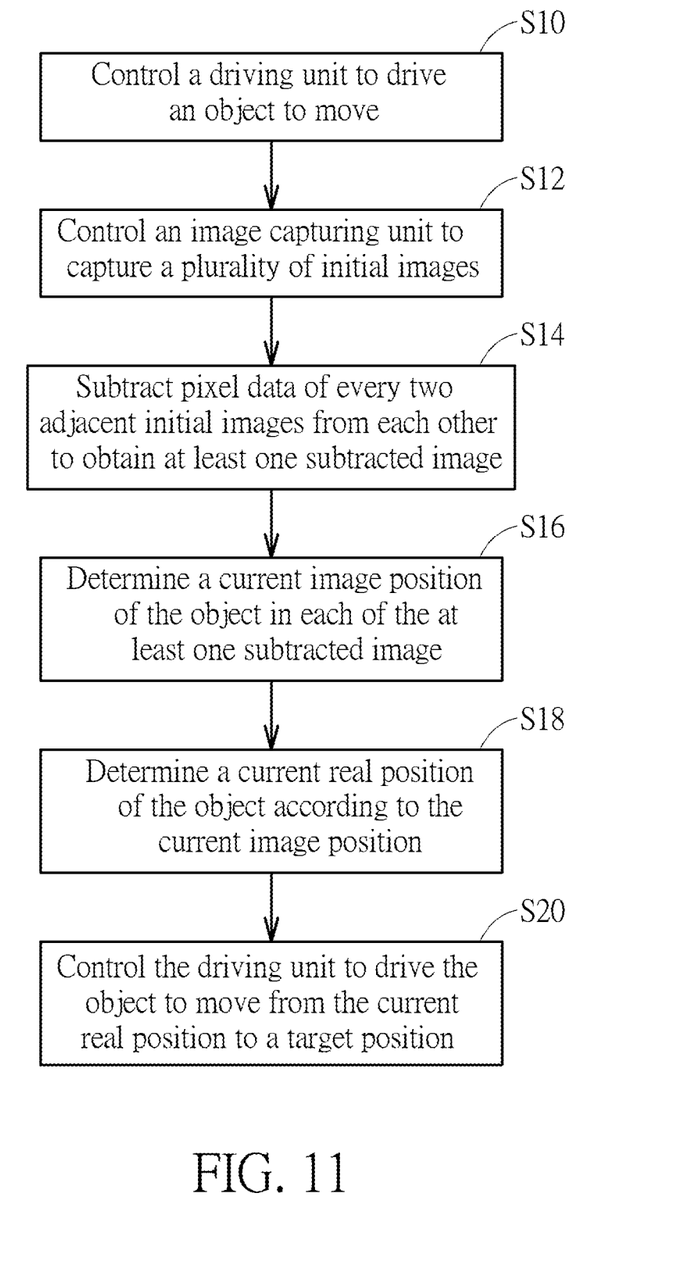
FIG. 11 is a flowchart illustrating an object driving method according to an embodiment of the invention.

Referring to FIG. 11, FIG. 11 is a flowchart illustrating an object driving method according to an embodiment of the invention. The object driving method shown in FIG. 11 may be implemented by the aforesaid object driving device 1. First, step S10 is performed to control a driving unit 12 to drive an object 10 to move. Then, step S12 is performed to control an image capturing unit 14 to capture a plurality of initial images I1-I5. Then, step S14 is performed to subtract pixel data of every two adjacent initial images I1-I5 from each other to obtain at least one subtracted image S1-S4. Then, step S16 is performed to determine a current image position of the object 10 in each of the at least one subtracted image S1-S4. Then, step S18 is performed to determine a current real position of the object 10 according to the current image position. Then, step S20 is performed to control the driving unit 12 to drive the object 10 to move from the current real position to a target position.

Before subtracting pixel data of every two adjacent initial images I1-I5 from each other, the object driving method of the invention may perform a binarization process on each of the initial images I1-I5. Furthermore, after performing the binarization process on each of the initial images I1-I5, the object driving method of the invention may selectively perform a blur process on each of the initial images I1-I5. Moreover, after obtaining the at least one subtracted image S1-S4, the object driving method of the invention may perform a binarization process on each of the at least one subtracted image S1-S4.

It should be noted that the detailed embodiments of the object driving method of the invention are mentioned in the above and those will not be depicted herein again. Furthermore, each part or function of the control logic of the object driving method shown in FIG. 11 may be implemented by software, hardware or the combination thereof.

As mentioned in the above, the invention determines the current real position of the object by image process and calculation, so as to control the driving unit to drive the object to move from the current real position to the target position. Accordingly, the invention does not need to install the origin sensor or the brake mechanism of the prior art. Therefore, the invention can reduce the cost and improve the accuracy of driving the object to move effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object driving device comprising:
   an object;
   a driving unit connected to the object;
   an image capturing unit; and
   a processing unit electrically connected to the driving unit and the image capturing unit, the processing unit controlling the driving unit to drive the object to move and controlling the image capturing unit to capture a plurality of initial images, the processing unit subtracting pixel data of every two adjacent initial images from each other to obtain at least one subtracted image, the processing unit determining a current image position of the object in each of the at least one subtracted image, the processing unit determining a current real position of the object according to the current image position, the processing unit controlling the driving unit to drive the object to move from the current real position to a target position.

2. The object driving device of claim 1, wherein a surface of the object has a predetermined pattern and the processing unit determines the current image position of the object in each of the at least one subtracted image according to the predetermined pattern.

3. The object driving device of claim 1, wherein before subtracting pixel data of every two adjacent initial images from each other, the processing unit performs a binarization process on each of the initial images; after performing the binarization process on each of the initial images, the processing unit selectively performs a blur process on each of the initial images.

4. The object driving device of claim 1, wherein after obtaining the at least one subtracted image, the processing unit performs a binarization process on each of the at least one subtracted image.

5. The object driving device of claim 1, wherein the processing unit determines the current real position of the object according to a ratio of the current image position to an image width of the subtracted image and a rotation angle range of the driving unit.

6. The object driving device of claim 5, wherein the processing unit determines the current real position of the object by an equation below:

$$Pr = \frac{Pi}{W} \times RA;$$

wherein Pr represents the current real position, Pi represents the current image position, W represents the image width of the subtracted image, and RA represents the rotation angle range of the driving unit.

7. The object driving device of claim 1, wherein when the current real position is located at a first side of the target position, the processing unit controls the driving unit to drive the object to move to the target position in a first direction by a difference between the current real position and the target position; when the current real position is located at a second side of the target position, the processing unit controls the driving unit to drive the object to move to the target position in a second direction by the difference between the current real position and the target position; the first side is opposite to the second side and the first direction is opposite to the second direction.

8. The object driving device of claim 1, wherein the object is a wiper.

9. An object driving method comprising steps of:
   controlling a driving unit to drive an object to move;
   controlling an image capturing unit to capture a plurality of initial images;
   subtracting pixel data of every two adjacent initial images from each other to obtain at least one subtracted image;
   determining a current image position of the object in each of the at least one subtracted image;
   determining a current real position of the object according to the current image position; and controlling the driving unit to drive the object to move from the current real position to a target position.

10. The object driving method of claim 9, wherein a surface of the object has a predetermined pattern and the object driving method determines the current image position of the object in each of the at least one subtracted image according to the predetermined pattern.

11. The object driving method of claim 9, further comprising steps of:
before subtracting pixel data of every two adjacent initial images from each other, performing a binarization process on each of the initial images; and
after performing the binarization process on each of the initial images, selectively performing a blur process on each of the initial images.

12. The object driving method of claim 9, further comprising steps of:
after obtaining the at least one subtracted image, performing a binarization process on each of the at least one subtracted image.

13. The object driving method of claim 9, wherein the object driving method determines the current real position of the object according to a ratio of the current image position to an image width of the subtracted image and a rotation angle range of the driving unit.

14. The object driving method of claim 13, wherein the object driving method determines the current real position of the object by an equation below:

$$Pr = \frac{Pi}{W} \times RA;$$

wherein Pr represents the current real position, Pi represents the current image position, W represents the image width of the subtracted image, and RA represents the rotation angle range of the driving unit.

15. The object driving method of claim 9, wherein when the current real position is located at a first side of the target position, the object driving method controls the driving unit to drive the object to move to the target position in a first direction by a difference between the current real position and the target position; when the current real position is located at a second side of the target position, the object driving method controls the driving unit to drive the object to move to the target position in a second direction by the difference between the current real position and the target position; the first side is opposite to the second side and the first direction is opposite to the second direction.

16. The object driving method of claim 9, wherein the object is a wiper.

* * * * *